United States Patent
Kennamer, Sr.

(10) Patent No.: US 10,293,887 B1
(45) Date of Patent: *May 21, 2019

(54) HIGH SPEED SHIP WITH TRI-HULL (71) Applicant: Paul D. Kennamer, Sr., Grant, AL (US)

(72) Inventor: Paul D. Kennamer, Sr., Grant, AL (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/600,765

(22) Filed: May 21, 2017

Related U.S. Application Data (60) Continuation-in-part of application No. 15/132,149, filed on Apr. 18, 2016, now Pat. No. 10,099,750,
(Continued)

(51) Int. Cl.
*B63B 1/10* (2006.01)
*B63B 1/18* (2006.01)
(Continued)

(52) U.S. Cl.
CPC .............. *B63B 1/20* (2013.01); *B63B 1/10* (2013.01); *B63B 1/18* (2013.01); *B63B 1/22* (2013.01);
(Continued)

(58) Field of Classification Search
CPC .... B63B 1/02; B63B 1/04; B63B 1/10; B63B 1/12; B63B 1/18; B63B 2001/183;
(Continued)

(56) References Cited

U.S. PATENT DOCUMENTS 3,561,389 A   2/1971  Hunt ............................ 114/285
3,902,445 A * 9/1975  Stolk ......................... B63B 1/20
                                                       114/289
(Continued)

OTHER PUBLICATIONS

Bobel, Veronica et al; The Eureka Project, Design of an Enhanced Deep Vee planning hull for the Reduction of Planing Resistance; Florida Institute of Technology; Jul. 1999.
(Continued)

*Primary Examiner* — Ajay Vasudeva
(74) *Attorney, Agent, or Firm* — James Richards (57) ABSTRACT

A high speed ship configuration for achieving a plane state efficiently, with threshold power available in fully loaded cargo ship. The system may include a boost phase assist structure to assist in the achievement of a plane state. The boost assist may be external or internal to the ship. The boost assist may provide power and/or lift assist. One embodiment may include a launch rail. In one embodiment, the configuration includes a retractable lateral wing structure disposed toward the stern of the vessel and containing auxiliary power providing thrust for the vessel. The wing structure is deployed during an initial boost phase acceleration and may be stowed in the vessel once the vessel achieves full plane operation. In one embodiment, the boost power structure may include propeller drive, paddle drive, or waterjet drive. The boost power structure may provide buoyancy and/or hydrodynamic trim to assist in achieving plane state operation.

8 Claims, 6 Drawing Sheets

Related U.S. Application Data which is a division of application No. 13/738,077, filed on Jan. 10, 2013, now Pat. No. 9,315,234.

(60) Provisional application No. 62/339,866, filed on May 21, 2016, provisional application No. 61/586,106, filed on Jan. 12, 2012.

(51) Int. Cl.

| | |
|---|---|
| *B63B 1/20* | (2006.01) |
| *B63B 1/22* | (2006.01) |
| *B63H 5/125* | (2006.01) |
| *B63B 1/32* | (2006.01) |
| *B63H 5/02* | (2006.01) |
| *B63H 5/07* | (2006.01) |

(52) U.S. Cl.
CPC ............... *B63B 1/32* (2013.01); *B63H 5/02* (2013.01); *B63H 5/07* (2013.01); *B63H 5/125* (2013.01); *Y02T 70/12* (2013.01)

(58) Field of Classification Search
CPC ....... B63B 2001/186; B63B 1/20; B63B 1/22; B63B 1/32; B63H 5/02; B63H 5/07; B63H 5/08; B63H 5/125; B63H 11/00
See application file for complete search history.

(56) References Cited

U.S. PATENT DOCUMENTS

| | | | | |
|---|---|---|---|---|
| 3,983,832 | A | 10/1976 | Kinder | 115/1 R |
| 4,004,544 | A | 1/1977 | Moore | 115/50 |
| D245,902 | S * | 9/1977 | Rogers | D12/312 |
| 4,058,077 | A | 11/1977 | Johansson | 114/283 |
| 4,061,104 | A | 12/1977 | Pinchot, III | 114/281 |
| 4,080,922 | A | 3/1978 | Brubaker | 114/282 |
| 4,171,675 | A | 10/1979 | Thompson | 116/16 |
| RE31,563 | E | 4/1984 | Stout et al. | 114/283 |
| 4,458,622 | A | 7/1984 | Anderson | 114/284 |
| 4,774,902 | A | 10/1988 | Sinclair, Jr. | 114/56 |
| 4,775,341 | A | 10/1988 | Tyler et al. | 440/38 |
| 4,813,365 | A | 3/1989 | Lindstron et al. | 114/56 |
| RE33,359 | E | 10/1990 | Lang | 114/61 |
| 4,962,718 | A | 10/1990 | Gornstein | 114/274 |
| 5,129,343 | A | 7/1992 | Giles | 114/56 |
| 5,134,954 | A * | 8/1992 | Barry | B60F 3/0015 114/274 |
| 5,178,085 | A | 1/1993 | Hsu | 114/61 |
| D336,887 | S * | 6/1993 | Granie | D12/310 |
| 5,231,946 | A | 8/1993 | Giles | 114/56 |
| 5,301,624 | A | 4/1994 | Hall et al. | 114/61 |
| 5,387,141 | A | 2/1995 | Toyohara et al. | 440/41 |
| 5,398,628 | A | 3/1995 | Rethorst | 114/272 |
| 5,419,274 | A | 5/1995 | Van Diepen | 114/271 |
| 5,435,260 | A * | 7/1995 | Granie | B63B 1/12 114/290 |
| 5,592,894 | A | 1/1997 | Johnson | 114/270 |
| 5,655,473 | A * | 8/1997 | Arvilla | B63B 1/042 114/288 |
| 5,701,835 | A | 12/1997 | Borseth | 114/56 |
| 5,704,308 | A | 1/1998 | Anderson | 114/285 |
| 5,823,130 | A | 10/1998 | Kreyn et al. | 114/61 |
| 6,038,995 | A | 3/2000 | Karafiath et al. | 114/271 |
| 6,044,784 | A | 4/2000 | Gee et al. | 114/61.15 |
| 6,131,529 | A | 10/2000 | Smith | 114/271 |
| 6,158,369 | A | 12/2000 | Calderon | 114/56.1 |
| 6,213,042 | B1 | 4/2001 | Delfosse | 114/61.1 |
| 6,311,635 | B1 | 11/2001 | Vaton | 114/272 |
| 6,561,857 | B1 | 5/2003 | Mass | 440/38 |
| 6,668,743 | B1 | 12/2003 | Reynolds | 114/61.27 |
| 6,708,642 | B1 * | 3/2004 | Taylor | B63B 1/042 114/290 |
| 6,874,439 | B2 | 4/2005 | Conti | 114/61.1 |
| 6,966,271 | B2 | 11/2005 | Norek | 114/56.1 |
| 7,040,244 | B1 | 5/2006 | Ferran | 114/61.14 |
| 7,055,450 | B2 | 6/2006 | Errecalde | 114/272 |
| 7,188,580 | B1 | 5/2007 | Borman | 114/272 |
| 7,246,565 | B2 | 7/2007 | Snook et al. | 114/288 |
| 7,381,109 | B2 | 6/2008 | Au | 440/90 |
| 7,581,508 | B2 | 9/2009 | Giles | 114/289 |
| 7,685,953 | B2 | 3/2010 | Giles | 114/72 |
| 9,315,234 | B1 * | 4/2016 | Kennamer, Sr. | B63H 5/125 |
| 10,099,750 | B1 * | 10/2018 | Kennamer, Sr. | B63H 5/125 |
| 2005/0204981 | A1 * | 9/2005 | Little | B63B 1/12 114/61.1 |

OTHER PUBLICATIONS

Savitsky, Daniel; On the Subject of High-Speed Monohulls; Presented to the Greek Section of the Society of Naval Architects; Stevens Institute of Technology; Oct. 2003.

Woodward, Chris; The perfect boat hull; Sport Fishing Magazine; Blog post posted May 2012.

Lathrop, Tom et al; Boatdesign.net; Blog Post Aug. 2003.

* cited by examiner

HIGH SPEED SHIP WITH TRI-HULL

RELATED APPLICATIONS

This application claims the benefit under USC 119(e) of provisional application 62/339,866 titled: "high speed ship with tri-hull", filed 21 May 2016 by Kennamer; this application is a continuation in part of U.S. application Ser. No. 15/132,149, titled: "High Speed Ship", filed 18 Apr. 2016 by Kennamer; which is a divisional of U.S. application Ser. No. 13/738,077 titled: "High Speed Ship", filed Jan. 10, 2013 by Kennamer, which is a nonprovisional of U.S. provisional application 61/586,106 titled "High Speed Ship" filed Jan. 12, 2012 by Kennamer. The above listed patent documents are hereby incorporated herein by reference in their entirety.

FIELD OF THE INVENTION

The present invention pertains generally to the field of high speed ocean going ships, more particularly to ship configurations for achieving a planing state.

BACKGROUND

There is an increasing need for surface ships that can transit oceans with greater speed, i.e. in the range of forty to fifty knots, and with high stability because of the commercial requirements for rapid and safe ocean transits of perishable cargoes, high cost capital goods, military strategic sealift cargoes, cargoes whose dimensions and density cannot be accepted for air freight, and other time sensitive freight, particularly in light of the increasing worldwide acceptance of "just-in-time" inventory and stocking practices. Today's container ships are tending towards greater size, for reduced cargo ton-mile costs, carrying up to 25,000 tons of containerized cargo at a time. This necessitates their visiting a number of ports on both sides of an ocean crossing to load and unload cargo. This is time-consuming and means that the largest ships can only undertake a relatively small number of ocean crossings per year, thus limiting the available financial turnover on their considerable investment cost.

Numerous approaches have been proposed for achieving high speed ocean crossing. These include using smaller ships, semi-planing hulls, catamarans, multi-hulls, hydrofoils, surface effect vessels. In association with high speed vessels, highly efficient loading and unloading systems have been proposed to increase the number of trips achievable in an annual time period.

One such vessel is a monohull fast ship as proposed in U.S. Pat. No. 7,581,508, by Giles, which is incorporated herein by reference. The monohull design is said to be a semi planing hull designed for carrying on the order of 10,000 tons at transoceanic transit speeds of up to 37 to 50 knots. Other designs include a surface effect vessels that incorporate rigid catamaran-like side hulls and bow and stern seals to create a plenum pressurized by air. The result is a craft which is 80 percent supported by pressurized air and 20 percent supported by buoyancy. When the plenum is pressurized (on-cushion), the wetted surface of the side hulls is reduced, reducing drag and allowing high speeds.

BRIEF DESCRIPTION OF THE DISCLOSURE

Briefly, the present disclosure pertains to a high speed ship configuration for achieving a plane state efficiently, with threshold power available in fully loaded cargo ship. The system may include a boost phase assist structure and/or a load shift mechanism to assist in the achievement of a plane state. The boost assist may be external or internal to the ship. The boost assist may provide power and/or lift assist. In one embodiment, the configuration includes a retractable lateral wing structure disposed toward the stern of the vessel and containing auxiliary power providing thrust. The wing structure is deployed during an initial boost phase acceleration and may be stowed in the vessel once the vessel achieves full plane operation. In one embodiment, the boost power structure may include propeller drive, paddle drive, or waterjet drive. The boost power structure may provide buoyancy and/or hydrodynamic trim to assist in achieving plane state operation.

The disclosure may be particularly applicable to a vessel having insufficient cruise power from the cruise power source to achieve plane from a fixed configuration of trim and/or weight distribution.

One embodiment comprises a system for assisting a vessel in achieving plane state operation, comprising:

a launch rail system configured for supporting said vessel in height and pitch attitude corresponding to a plane state while said vessel has a velocity less than required for plane state operation, said launch rail configured to allow said vessel to accelerate to full plane state velocity while being supported by said launch rail.

In a further embodiment the system includes a power assist.

In a further embodiment a starting end of the launch rail is elevated to impart kinetic energy into the vessel as the vessel travels down the launch rail.

In an alternative embodiment, the system may comprise a boost power structure configured to be deployed and retracted, deployable extending from a side of the vessel, longitudinally between amidships and the stern of the vessel; the boost power structure comprising at least one engine operatively coupled to at least one thrust producing device;

The disclosure also pertains to a method for assisting a vessel to achieve a plane state, comprising: deploying a boost power source coupled to a boost thrust mechanism for a speed less than a minimum planing speed, said boost thrust mechanism separate from a main thrust mechanism; and retracting the boost thrust mechanism for a cruise speed greater than the minimum planing speed.

In one embodiment, the system comprises a method for achieving a plane state comprising the steps:

the ship is initially established at rest;

a variable trim is set to achieve a relatively higher pitch angle when underway;

a load is shifted aft to further increase the pitch angle;

in a power boost embodiment, the retractable power boost is deployed;

power is applied to accelerate the ship;

upon achieving a first speed at a high pitch angle, the load is shifted to a forward position and the trim is adjusted to achieve a lower pitch angle and bring the ship into a plane operational state;

in a further optional step, upon achieving a second speed, the load is shifted further forward and the trim is adjusted to achieve a further lower pitch angle; additional load and trim adjustments may be applied to incrementally transition from the pitch up (plowing) configuration to the plane configuration;

upon achieving a full plane state, power is reduced, the load is shifted to a neutral position, and the trim is set for best plane speed for the load and power setting. At this point, if deployed, a retractable power boost system may be retracted and stowed aboard the ship;

the ship maintains cruise speed in a plane state.

In a further embodiment, the boost power may be rotatable to provide a variable thrust angle and the rotation may progressively be varied as the plane state is progressively achieved.

The present disclosure, may be applied to vessels of any size from small runabouts and bass boats to ocean going freighters. Of particular interest is the heavy load freight industry. It may be possible in light of the present invention to consider planing type hulls and plane state operation at larger freight sizes than previously thought feasible, for example 10,000 tons, 100,000 tons and larger. The system may be considered for vessels of any size.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 illustrates a close-up top view of the boost power structure of FIG. 4a.

DETAILED DESCRIPTION

The disclosure pertains to a high speed ocean going cargo class ship and method of achieving the high speed. The high speed is envisioned as being higher than the traditional view of high speed being 20 to 40 knots. 100 knots and higher is envisioned. The system is applicable to a wide range of ship sizes and should scale to include the largest cargo class ships.

The ship may have a planing hull in one or more hulls, and may possibly include pontoons as part of the hull structure.

A planing hull is employed as the primary operative hull structure at the top speed of the vessel. Additional auxiliary hull structures, such as pontoons or side hulls or surface effect structures may also be employed for further improved efficiency. Friction reducing coatings and polymers may be deployed for additional speed.

In accordance with one embodiment, it is observed that a vessel in a plane state glides across the water with relative ease. As the ship slows down and sinks lower into the water, it generates a larger wake and encounters more drag. The pitch of the vessel may change, typically pointing the nose higher against the horizon. Finally the vessel sinks to buoyant equilibrium and travels entirely in slip stream mode. Similarly, a vessel starting out initially travels in slip stream mode relying on the buoyancy of the ship to establish the water line. As the vessel accelerates, the bow becomes elevated and the vessel ploughs through the water, often with the stern lower in the water than the stationary water line. In this pitch up configuration, a tremendous amount of power is required that is dissipated as a function of the high drag inefficient configuration of the vessel. As additional power is provided, the vessel is able to ride up on top of the water and achieve a plane state. The bow drops to the horizon, the vessel levels off, and accelerates. Drag is significantly reduced. The vessel now rides substantially on top of the water, depending on hydrodynamic lift rather than buoyancy to establish the relative water line. Thus, for many planing hulls, more power is required to achieve a planing state than is required to maintain the planing state. For the purposes of this disclosure, a vessel in a planing state receives at least 50% of its support from hydrodynamic and/or aerodynamic lift. The remainder being supplied by buoyancy.

In accordance with one embodiment, a vessel may be equipped with a boost phase auxiliary power and/or lift system that is used to accomplish the transition from slip stream to planing and then the boost power system is removed/stowed for the cruise phase while the vessel is in the planing state.

In accordance with another embodiment, the planing system may provide lift, with or without providing additional power.

Figure 1:
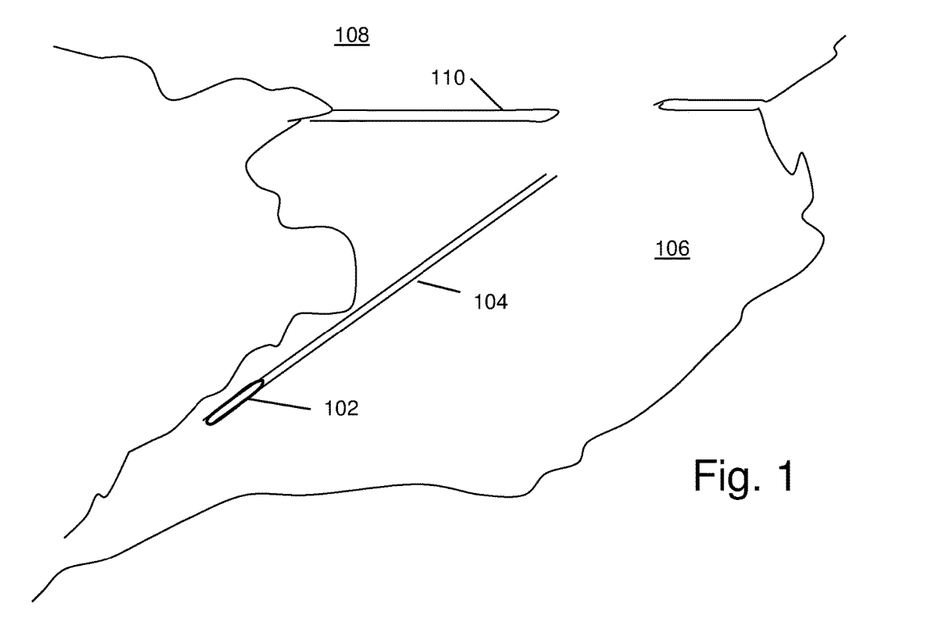
FIG. 1 is a diagram of an exemplary launch assist device in accordance with the present invention.

The embodiments will now be further explained with reference to the drawings. FIG. 1 is a diagram of an exemplary launch assist device in accordance with the present invention. Referring to FIG. 1, the launch assist device comprises a pair of launch rails, one on each side of the vessel. The vessel is configured to run on the launch rails over the water elevated above the buoyancy level of the vessel. Rolling wheels are provided on the vessel to run on the rail. The vessel accelerates while elevated by the launch rail. The rail should have sufficient length so that the vessel achieves full plane velocity by the end of the launch rail. The objective is to achieve equilibrium plane state at the end of the launch rail and then transition smoothly to plane state travel free of the rail. In one embodiment, the vessel may provide all of the power for acceleration and the rail only provides lift. In another embodiment, the rail may include additional power to accelerate the vessel. In a third embodiment, the rail may start at substantial elevation and utilize gravity to assist in accelerating the vessel.

Referring to FIG. 1, a vessel 102 is shown at the starting end of a launch rail 104. The vessel and launch rail are in a harbor 106 protected by jetties 110 from the ocean 108. The launch rail 104 supports the vessel in a plane elevation, or higher so that the vessel 102 may accelerate to plane velocity without the drag associated with deep draft configurations.

The vessel may be coupled to the water sufficiently to allow the propeller or other propulsion system to operate to accelerate the vessel.

Figure 2:
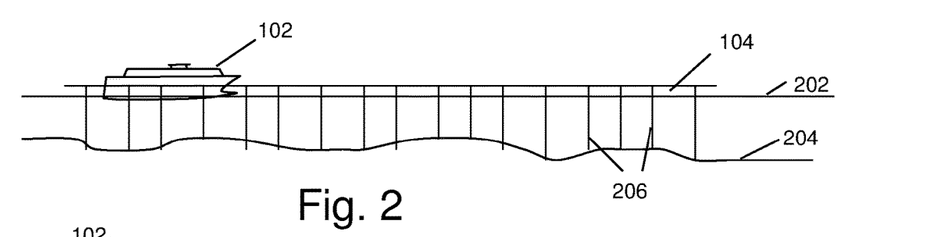
FIG. 2 illustrates an exemplary launch rail configured parallel to the water surface.

FIG. 2 illustrates an exemplary launch rail configured parallel to the water surface. FIG. 2 shows the vessel 102 at the starting end of the launch rail. The launch rail may be coupled to the ship above the water to prevent drag from the coupling mechanisms. The vessel may run on the rail using rolling wheels similar to railroad wheels, but scaled appropriately and supplied in sufficient numbers for the vessel size. In one embodiment, the wheels may be attached to the ship and remain with the ship during cruise. In an alternative embodiment, the wheels may be affixed to the rail or affixed to a carriage assembly that separates from the ship for cruise and stays behind a the port. FIG. 2 shows the vessel, 102, the launch rail 104, the relative sea level water level 202 the sea bed 204 and supports 206 for the launch rail. The ship is initially supported at plane height and pitch attitude. As the vessel accelerates, the vessel gradually supports itself on the water. At the end of the launch rail, the vessel is up to full plane velocity and fully supporting itself. The vessel then continues to complete the cruise at plane velocity.

In a further embodiment the launch rail or carriage may include additional power to help accelerate the vessel.

Figure 3:
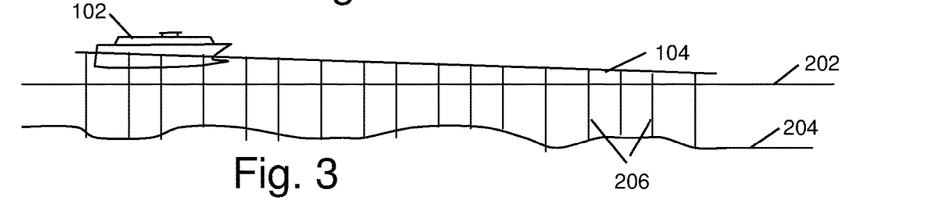
FIG. 3 illustrates an alternative exemplary launch rail configured with a slope to provide additional initial acceleration to the vessel.

FIG. 3 illustrates an alternative exemplary launch rail configured with a slope to provide additional initial acceleration to the vessel. The launch rail 104 is elevated, for example 200 ft, (60 meters) at the starting end. The vessel then rolls down the rail to pick up initial velocity. The vessel then arrives at the water at plane velocity and plane height.

One issue with the launch rail approach is that if the vessel is required to slow down or stop in mid ocean, the vessel could not, on its own, resume plane state travel. The ship does not carry enough power to transition to plane state. The trip would have to be completed at slow speed or a floating launch rail system would have to be delivered to the vessel. Alternatively, boost power may be carried by the vessel.

Figure 4A:
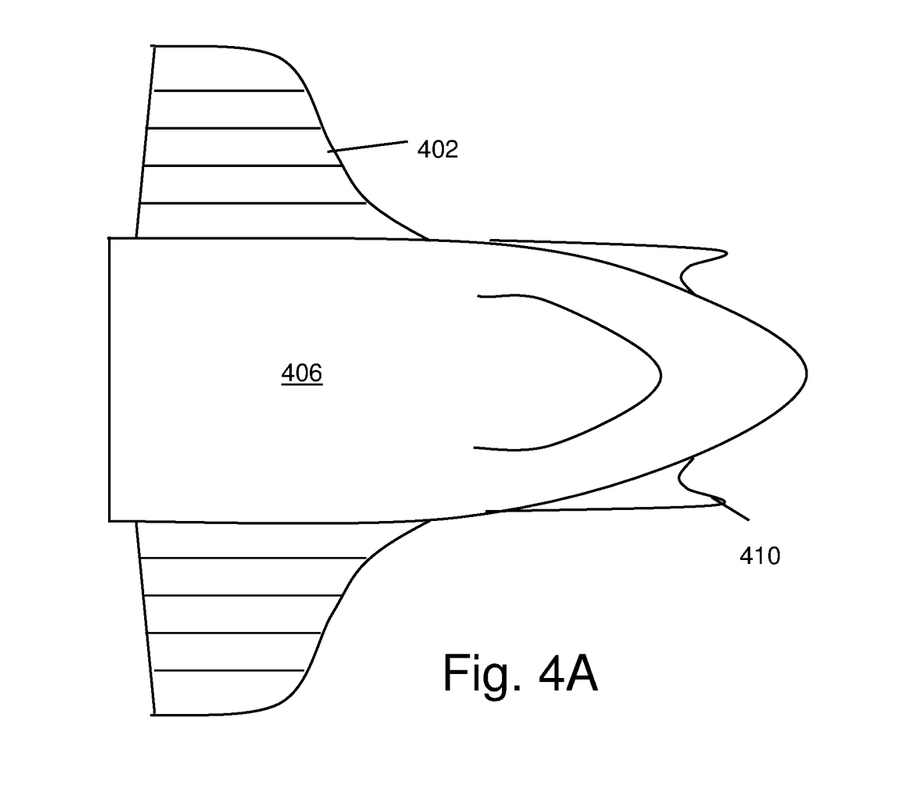
FIG. 4A illustrates an exemplary top view of a vessel having a boost power system carried by the vessel.

FIG. 4A illustrates an exemplary top view of a vessel having a boost power system carried by the vessel. FIG. 4A illustrates an exemplary vessel 406 having a conventional main power system (not shown) for plane state cruise and an additional boost power system 402 to provide power to achieve transition to the plane state. The boost power system 402 is configured to be stowed during cruise to minimize aerodynamic and/or hydrodynamic drag. The exemplary system of FIG. 4A shows the boost power system configured as a foldable wing structure 402 that may be extended during the boost phase and retracted during cruise. (The boost power structure 402 may alternatively be referred to as a wing or wing shaped structure in this disclosure, although the boost power structure need not necessarily take the form of a wing shape.) The wing structure may be stowed inside the aerodynamically designed hull superstructure to minimize aerodynamic drag during cruise.

The wing shaped boost power structure comprises multiple foldable sections, foldable in the manner of an accordion when stowed and extended as a flat wing shape structure when in use. The wing shaped power structure comprises a plurality of compact light weight engines, each with a propulsion device to deliver thrust during the transition phase. Various thrust mechanisms may be employed including conventional propellers, jets, and paddle wheels. A unique under water paddle tread design is proposed later in this disclosure.

The boost power structure is preferably deployed toward the stern of the vessel as shown. During the boost phase, the stern may sink substantially, and thus, the boost structure may be designed to operate under water. Air for the engines may be ducted from the vessel to accommodate the underwater operation.

Figure 4B:
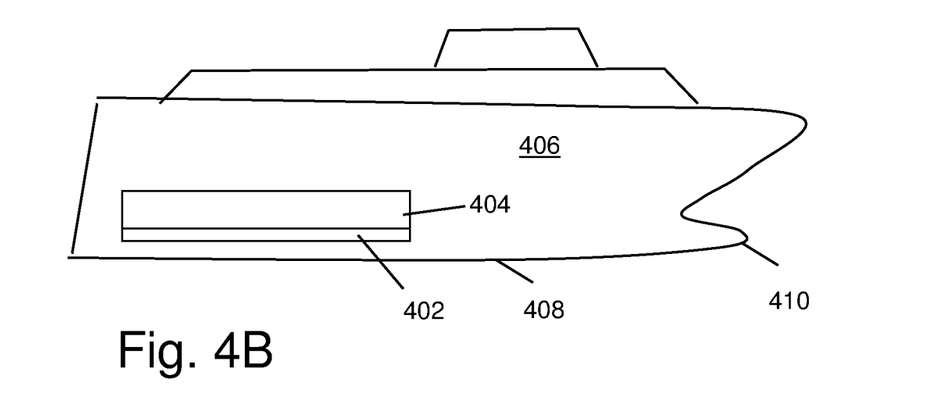
FIG. 4B illustrates a side view of the vessel of FIG. 1.

FIG. 4B illustrates a side view of the vessel of FIG. 1. FIG. 4B shows the vessel 406 having a planing type hull 408. The hull form shown uses side hulls similar to a surface effect vessel; however any type of planing hull or top of the water hull may be used with the present system. The side view shows the wing shaped power structure 402 and a hatch 404 for stowing the wing shaped structure 402 inside the hull during cruise.

Figure 5A:
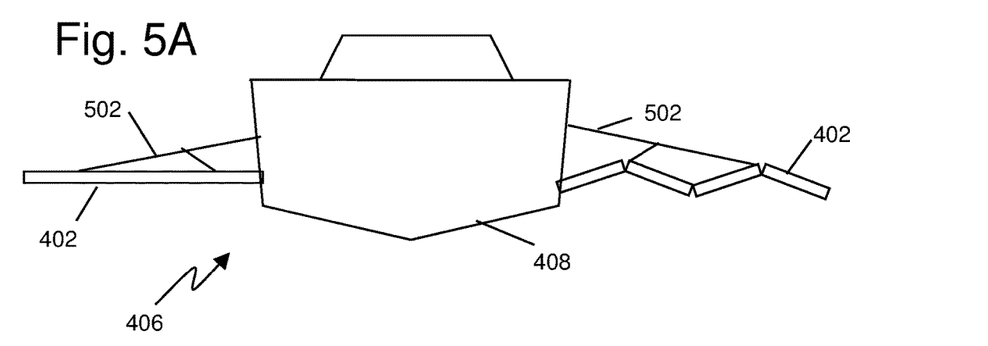
FIG. 5A illustrates a cross section of the exemplary vessel of FIG. 4A and 4B.

FIG. 5A illustrates a cross section of the exemplary vessel of FIG. 4A and 4B. The left side of the cross section shows the wing structure 402 with supporting truss structure 502 in the extended operating configuration. The right side shows the wing structure 402 folding to be stowed. The wing structure may comprise any number of sections. Four are illustrated in FIG. 5a. The wing structure folds in accordion like manner to be stowed inside the hull.

Figure 5B:
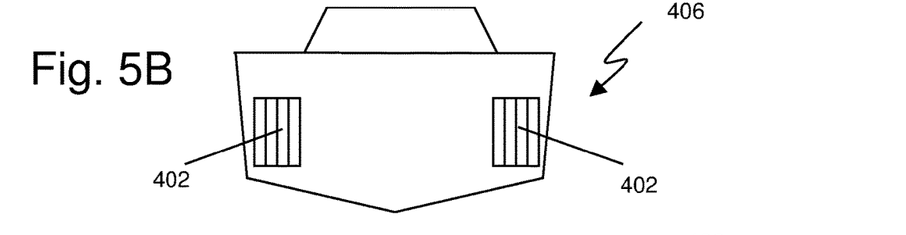
FIG. 5B illustrates the cross section of FIG. 5A with the wing structures folded completely and stowed inside the hull.
Figure 5C:
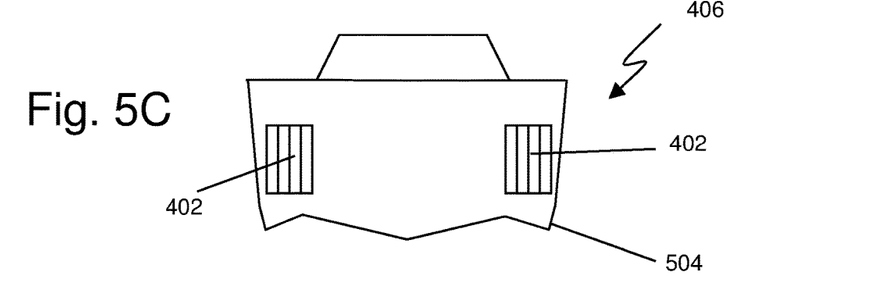
FIG. 5C illustrates a transom view of an alternative hull form of FIG. 5B.

FIG. 5B illustrates the cross section of FIG. 5A with the wing structures 402 folded completely and stowed inside the hull. FIG. 5C illustrates a transom view of an alternative hull form of FIG. 5B. FIG. 5C may be alternatively referred to as a cross section at the transom. Note the tri-hull features 504 of the hull cross section. The tri-hull outer hull features 504 form a downward projection at the outer edges of the hull. The downward projections are parallel to the direction of travel, i.e., the fore-aft center line of the vessel, and may extend to the forward projections 410 shown in FIG. 4A and FIG. 4B. The tri-hull forms a contiguous three peaked single hull in contact with the water across the entire span rather than three separate hulls.

Figure 5D:
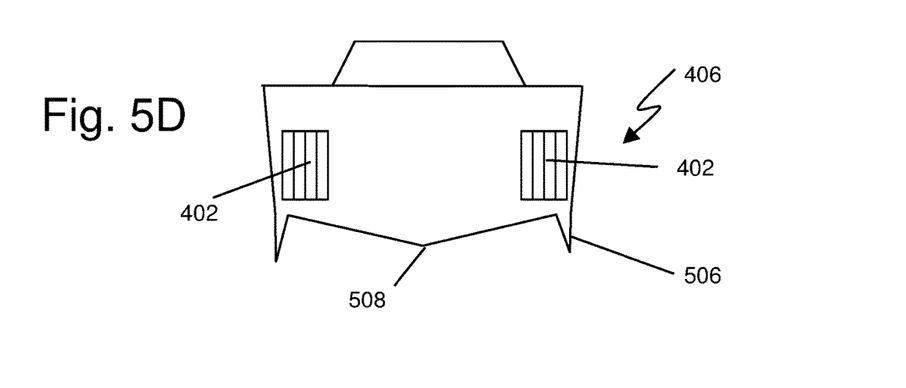
FIG. 5D illustrates a transom view of a further alternative hull form of FIG. 5B showing a sharper projection.

FIG. 5D illustrates a transom view of a further alternative hull form of FIG. 5B showing a sharper projection. The downward projections of FIG. 5C and FIG. 5D serve to reduce lateral movement of the water as plane is established and serve to form a forward wave or hump of water as the vessel bulldozes through the water before plane is fully established. As shown in FIG. 5D, the downward projections 506 may extend lower than the lowest downward point of the center hull 508. In a further variation, multiple downward projections 506, or 504 may be applied across the bottom of the hull. Three, four, five, or more may be provided, running parallel from bow to stern. The downward projections may serve to reduce lateral motion of the water and may serve to produce bubbles to reduce friction with the water at high speed.

Figure 6:
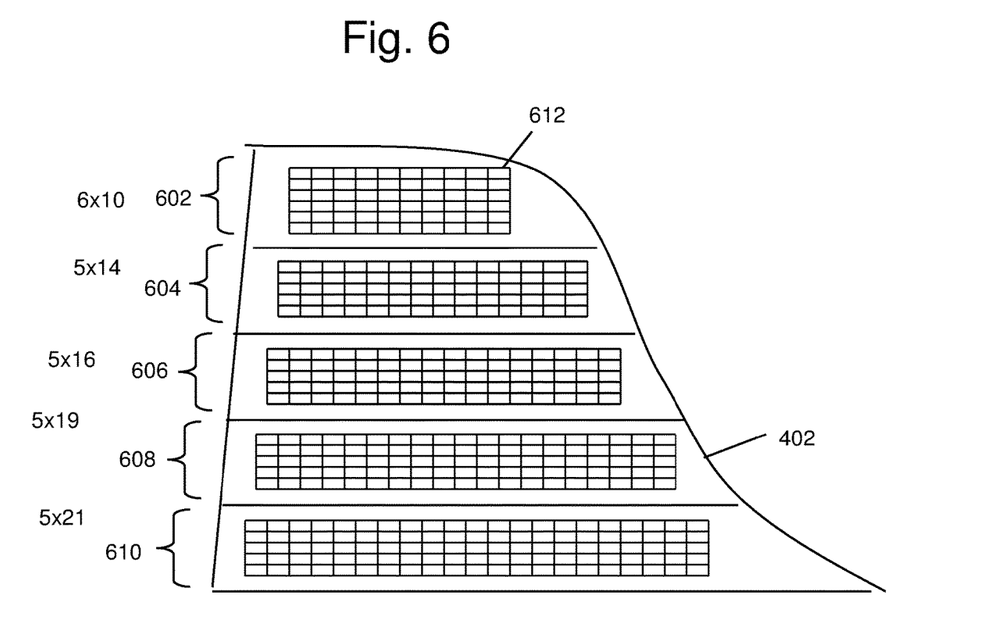

FIG. 6 illustrates a close-up top view of the boost power structure of FIG. 4a. FIG. 6 shows the wing shaped structure 402 containing a plurality of engine modules 612. The wing shaped structure comprises five segments, 602-610 that can fold in an accordion like manner for stowage in the hull as previously explained with respect to FIG. 5A and 5B. Each segment houses a number of engine modules. Each engine module may include a mechanism for producing thrust, such as a propeller, paddle structure, water jet or other structure. Referring to FIG. 6, the wing structure 402 is shown to have five segments 602-610. Any number of segments may be used, five are shown for illustration convenience. The outermost segment 602 at the top of the page is shown to have sixty engine modules arranged in a six by ten rectangular pattern. The upper right engine module 612 is referenced for discussion purposes. Any engine may be selected. Reference 612 refers only to one engine module of the six by ten pattern, not the whole pattern. The second segment 604 has seventy engine modules arranged five by fourteen. The third segment 606 has eighty engine modules arranged five by sixteen. The fourth segment 608 shows ninety five engines arranged five by nineteen. The fifth segment 610 has one hundred and five engines arranged five by twenty one. The number and arrangement of engine modules is a function of the power needed and the available size of the engines. Small light engines, preferably having light blocks, such as aluminum, may be used. A thin profile allows the engines to be fit within a thin wing shaped structure for minimum drag.

In one embodiment, the foldable boost power structure 402 may provide flotation for the engines to reduce the weight of the rear of the ship and may be set at an angle or variable and controllable angle to further provide trim for the ship. The foldable structure may provide additional lift through buoyancy to aid in initial boost phase trim for the ship.

Figure 7:
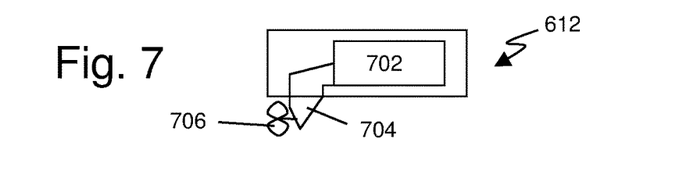
FIG. 7 illustrates an exemplary engine module in accordance with the present invention.

FIG. 7 illustrates an exemplary engine module in accordance with one variation of the present invention. The engine module 612 comprises an engine 702, a transmission, 704 and a propeller 706.

Figure 8:
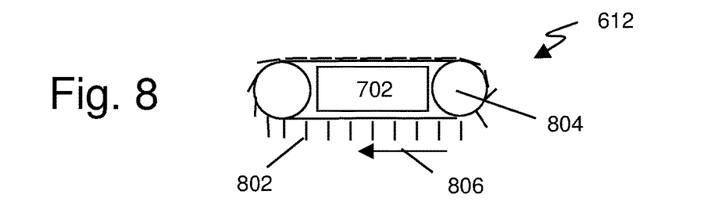
FIG. 8 illustrates an alternate engine module.

FIG. 8 illustrates an alternate engine module 612. The engine module comprises an engine 702 and a linear paddle track surrounding the engine. The paddle track comprises two wheels 804, one of which is driven by the engine. The track operates similar to a bulldozer track in the manner of coupling to the engine and running through the oval course. The track includes paddles 802 that are hinge coupled to the track. The paddles 802 extend perpendicular to the track on the bottom side providing thrust when coupled to the water. Direction of motion is shown by the arrow 806. The paddles are forced to lay flat on the upper side for the return path so as not to couple to the water on the upper side of the engine, which is the upper side of the boost power structure. During initial boost, the boost power structure may be submerged in the water, with the top and bottom covered with water. Thus, the top side paddles need to be decoupled from the water. Guides on the sides of the paddles or other mechanisms known in the art may be used to force the paddles to the paths and orientations as shown.

Figure 9A:
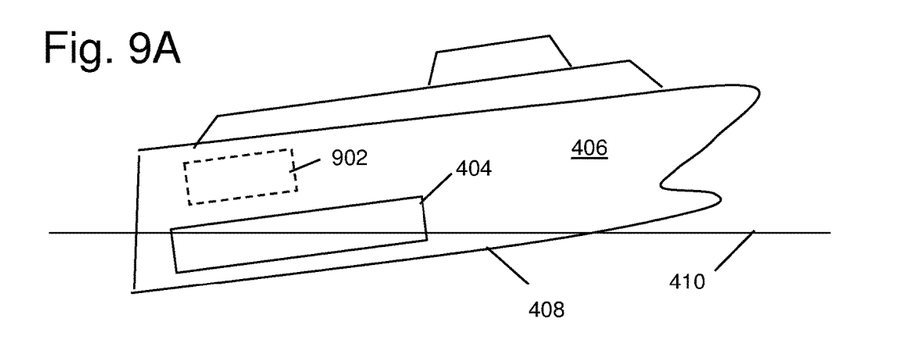
FIG. 9A-FIG. 9C illustrate various operational states of the vessel of FIG. 4A.
Figure 9B:
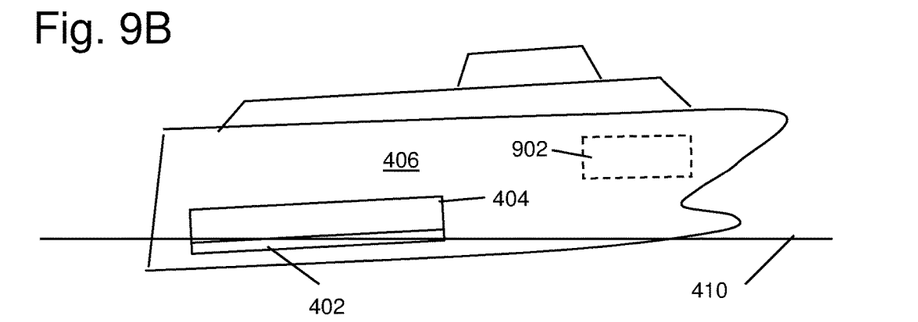
Figure 9C:
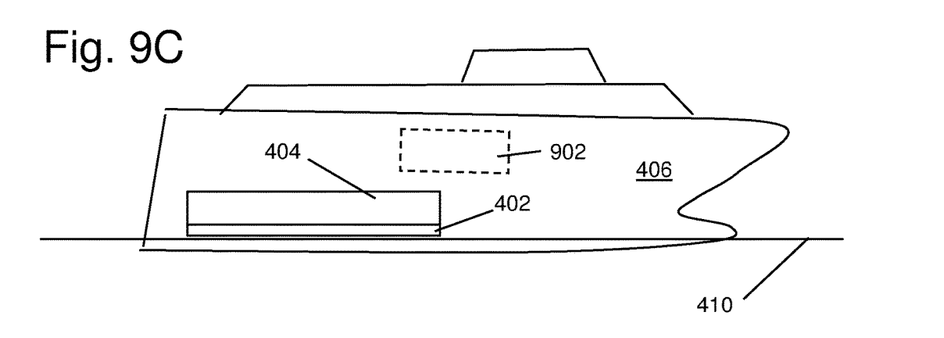

FIG. 9A-FIG. 9C illustrate various operational states of the vessel of FIG. 4A. FIG. 9A illustrates an attempt to achieve plane state without deploying the boost power. The vessel 406 is under full power, the bow is lifted as it plows into the water 410, but the stern sinks deeply into the water creating considerable drag and preventing the vessel from achieving plane state operation.

FIG. 9B illustrates the operation with the boost power structure deployed. The boost power structure 402 provides additional power to overcome the low speed drag. In addition, the buoyancy of the power structure and extra lift due to hydrodynamic lift of the wing shape structure 402 cooperate to lift the stern and level the vessel 406.

FIG. 9C illustrates the vessel at plane state. The vessel 406 is level and the boost power structure 402 may now be retracted and stowed in the hull. The hull may be closed with a cover 404 to provide maximum streamlined aerodynamic form to maximize the speed and efficiency of the plane state cruise configuration.

Referring further to FIGS. 9A, 9B, and 9C, in one embodiment, the invention comprises a method for achieving a plane state comprising the steps:

the ship is initially established at rest; (prior to FIG. 9A)

a variable trim 402 is set to achieve a relatively higher pitch angle when underway;

a load 902 is shifted aft to further increase the pitch angle;

in a power boost embodiment, the retractable power boost 402 (402 contains both variable trim and power boost) is deployed;

power is applied to accelerate the ship; (FIG. 9A)

upon achieving a first speed at a high pitch angle (FIG. 9A), the load 902 is shifted to a forward position (FIG. 9B) and the trim 402 is adjusted to achieve a lower pitch angle (FIG. 9B) and bring the ship into a plane operational state;

in a further optional step, upon achieving a second speed, the load is shifted further forward and the trim is adjusted to achieve a further lower pitch angle; additional load and trim adjustments may be applied to incrementally transition from the pitch up (plowing) configuration to the plane configuration;

upon achieving a full plane state (FIG. 9C), power is reduced, the load is shifted to a neutral position, and the trim is set for best plane speed for the load and power setting. At this point, if deployed, a retractable power boost system may be retracted and stowed aboard the ship;

the ship maintains cruise speed in a plane state.

Figure 10A:
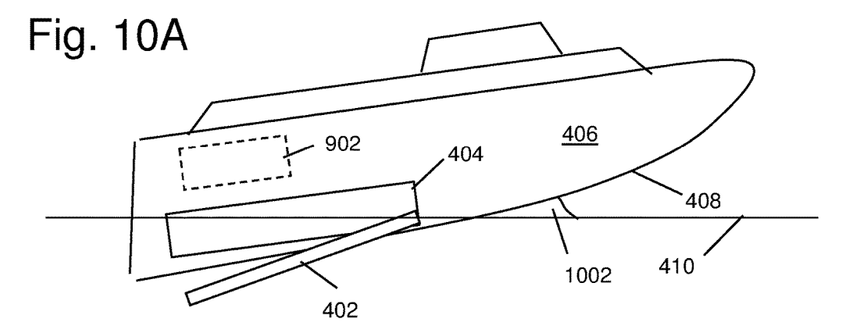
FIG. 10A-FIG. 10C illustrate various alternatives for the vessel of FIG. 4A.
Figure 10B:
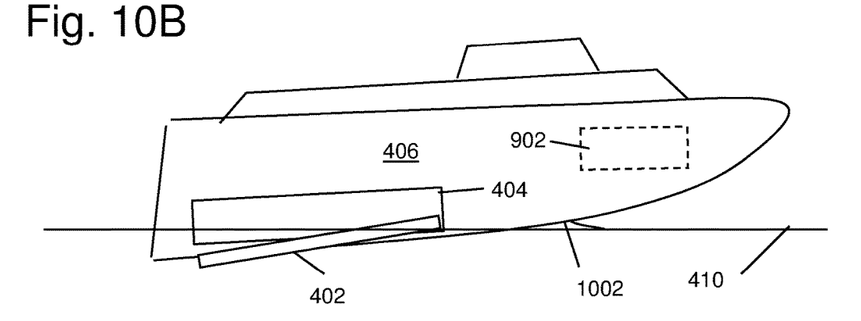
Figure 10C:
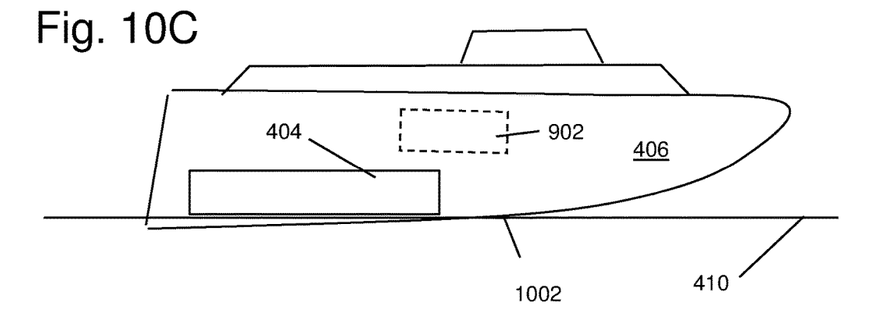

FIG. 10A-FIG. 10C illustrate various alternatives for the vessel of FIG. 4A. FIG. 10A-FIG. 10C show the boost power structure 402 capable of rotating about an axis parallel to the pitch axis of the vessel. Further, a more conventional and simplified planing hull 408 is shown. A leading wave 1002 is shown that is created by the hull pushing through the water at slow speed and high angle of attack. The leading wave diminishes as the vessel achieves a planing state.

Referring to FIG. 10A, the vessel is moving through the water at a slow speed using only the cruise engine. The vessel is at a high angle of attack and creates a large leading wave as it ploughs through the water and pushes the water in front of the vessel. The boost system is deployed. Optionally, the load shift may also operate as previously described. The boost system is shown to be pivotable/rotatable around an axis parallel to the vessel pitch axis. The boost system may be configured to provide lift and thrust to lift and rotate the vessel around a fulcrum or rotation point associated with the leading wave, where the hull first contacts the water.

Referring to FIG. 10B, as the vessel begins to achieve plane, the boost structure is rotated and the leading wave diminishes in size.

Referring to FIG. 10C, when the vessel achieves plane state, the boost structure may be stowed and the leading wave is essentially eliminated. Alternatively, the boost structure may be disengaged and configure for minimum drag. The vessel then operates on cruise power alone.

CONCLUSION

The present disclosure pertains to a vessel and method of operating a vessel to achieve an efficient plane state operational configuration not achievable directly with only the operational power of the cruise engine. The plane state is achieved with one or more boost power systems to first achieve plane state and then revert to only the cruise engine for maintaining the cruise state. Alternatively or in combination with the boost power, a temporary load shift may be performed to assist in achieving plane state. The use of a separate boost power allows the cruise engine to be designed and operated at maximum efficiency at the cruise speed. An engine designed for higher power and then throttled back for cruise would likely not operate at maximum efficiency for cruise.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for assisting a vessel in achieving a plane operation state, the vessel comprising a planing hull and a cruise power source having insufficient cruise power to achieve plane state operation from a fixed configuration of weight and trim, the system comprising:
   a boost power structure separate from said cruise power source, said boost power structure configured to be deployed and retracted, said boost power structure configured to deploy extending from a side of said vessel, and said boost power structure disposed longitudinally between amidships and a stern of the vessel;
   said boost power structure configured to be deployed at a speed less than a minimum planing speed; said boost power structure further configured to be retracted at a speed greater than said minimum planing speed;
   said boost power structure comprising one or more engines, each engine of said one or more engines operatively coupled to a respective thrust producing device of one or more thrust producing devices;
   wherein the vessel has a tri-hull hull cross section having at least three downward projections.

2. The system in accordance with claim 1, further including a variable trim configured for adjusting to lower a pitch angle of said vessel to achieve said plane operation state in conjunction with deploying said boost power structure.

3. The system in accordance with claim 1, wherein the boost power structure comprises a foldable wing structure having multiple sections foldable in alternating directions from section to section for stowing, and said foldable wing structure forming a flat wing shape structure when deployed.

4. The system in accordance with claim 3, wherein said one or more thrust producing devices are arranged on an underside of said foldable wing structure in an array of more than one column laterally and more than one row fore and aft.

5. The system in accordance with claim 3, wherein said one or more thrust producing devices comprises one or more of the group consisting of propellers, jets, and paddle wheels.

6. The system in accordance with claim 5, wherein at least one engine of said one or more engines is coupled to a linear circulating paddle track having hinged paddles forced to lay flat on an upper side moving forward and perpendicular to the track on a bottom side to provide thrust.

7. The system according to claim 5, wherein the tri-hull hull cross section has an outer downward projection extending further downward than a center downward projection.

8. The system according to claim 5, wherein the vessel is equal or greater than 10,000 tons maximum gross weight.

* * * * *